Patented June 9, 1931

1,809,800

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

METHOD OF MAKING COMPRESSIBLE AND ELASTIC MATERIAL

No Drawing.   Application filed December 21, 1925.  Serial No. 76,906.

This invention relates to a rubberized, bituminous, fibrated mixture, in which the penetration of the bituminous material in a liquid state is controlled, which permits of the fibrous material being incorporated in an unpenetrated state, or which permits of the introduction of finely divided fibrous material in the liquid bituminous material, and then toughening the mass with dissolved rubber or other suitable means, such as, utilization of uncoagulated latex, or other materials which will bind the mass about the fibre, increasing the tensile strength of the binding material.

The raw materials employed will consist of a suitable bituminous material, preferably from blown petroleum oils, solutions of reclaimed rubber, coagulated rubber cut back with naphthas, uncoagulated latex in a milky state, or uncoagulated, vulcanized latex, or any of the rubber solutions together with heated, liquefied bituminous material, having incorporated therein a vulcanizing accelerator, and introducing into said mixture, either before or after introduction of the vulcanizing agent, finely divided fibrous material, or coarse fibrous material, as the case may be, the mechanical contrivance used in mixing this mass having a steam jacket permitting the mass to be heated up to 300° F.

It is my desire that the vulcanizing process be only partially completed, so as not to destroy the possibility of rolling the batch into sheets or extruding the batch into flat strips.

Any suitable bituminous material, known to the art, may be employed, preferably one having a penetration of 20° at 32° F., and a melting point approximating between 200° and 240° F. The finely divided fibre may consist of cotton linters, cotton, shoddy dust, or other like materials, known to the art, and the coarse fibre may consist of excelsior, broom corn, flax, cocoanut fibre, hemp, flat grasses, etc.

The rubber composition may be introduced as reclaimed, and rubber cut back with a suitable solvent, such as, naphtha, kerosene, etc., or coagulated rubber may be utilized in the commercial form, cut back with the solvents described, or any other suitable solvent, including carbon tetrachloride or the latex in the uncoagulated form, as commercialized, may be employed in its natural state. The proportions will vary, depending upon the consistency of the mass, the toughness desired, the pliability or resiliency and the percentage of fibre.

To this mixture, before or after mixing the above ingredients, in varying proportions, may be added vulcanizing accelerators, such as, sulphur, diamines, urea, zinc oxide, and numerous other ingredients adapted for the purpose of imparting varying degrees of toughness and regulating the time required to approach either semi or entire vulcanization. In such rubberizing process may be included uncoagulated caoutchouc, or any substance in fact having the nature of these rubberizing substances.

A suitable formula for such mixture would be sixty-five (65) per cent bituminous material, fifteen (15) per cent of one of the rubber solutions, five (5) per cent of a vulcanizing accelerator and fifteen (15) per cent fibrous material, said mixture being incorporated in a mechanical mixer, pressed to sheet form and cut into suitable strips adapted for use as expansion joints.

I claim:

1. The herein described method of preparing preformed expansion joint material which consists in mixing a measured quantity of melted bituminous material with a measured quantity of liquid rubber, maintaining the bituminous material at a predetermined melted consistency, thereafter mixing in fibrous material in such a manner as to thoroughly incorporate the fibrous material in the mixture, and finally while the mixture is in a flowable, warm, plastic condition reducing it to form strips of expansion joint material of desired size.

2. The herein described method of preparing preformed expansion joint material which consists in mixing a measured quantity of melted bituminous material with a measured quantity of liquid rubber, maintaining the bituminous material at a predetermined melted consistency, thereafter mixing in fibrous material in such a manner as to thoroughly incorporate the fibrous material in the mixture, and finally while the mixture is in a flowable, warm, plastic condition extruding it to form strips of expansion joint material.

3. The herein described process of preparing preformed expansion joint material which consists in mixing measured quantities of melted bituminous material, liquid rubber, a vulcanizing agent and fibrous material in a mechanical mixer equipped with heating means to retain the mixture at a predetermined melted consistency, prolonging the mixing operation after all the materials have been introduced into the mixture to thoroughly mix the same, and finally removing the mixture from the mechanical mixer while in a warm, flowable, plastic condition and immediately reducing the same into preformed expansion joint strips by extrusion.

4. The herein described method of making expansion joint material which comprises mixing approximately sixty-five (65) per cent of melted bituminous material, fifteen (15) per cent of a rubber solution together with five (5) per cent of a vulcanizing agent, and adding thereto fifteen (15) per cent fibrous material, mixing said ingredients thoroughly to form a homogeneous mass, while maintaining the bituminous material at a predetermined melted consistency, and finally extruding the mixture while in a warm, flowable, plastic condition to form strips of expansion joint material.

5. The herein described method of preparing compressible and elastic material which consists in mixing a measured quantity of melted bituminous material with a measured quantity of rubber, maintaining the bituminous material at a predetermined melted consistency, thereafter mixing in fibrous material in such a manner as to thoroughly incorporate the fibrous material in the mixture, and finally while the mixture is in a flowable, warm, plastic condition reducing it to form strips of desired size.

6. The herein described method of preparing compressible and elastic material which consists in mixing a measured quantity of melted bituminous material with a measured quantity of rubber, maintaining the bituminous material at a predetermined melted consistency, thereafter mixing in fibrous material in such a manner as to thoroughly incorporate the fibrous material in the mixture, and finally while the mixture is in a flowable, warm, plastic condition extruding it to form strips.

7. The herein described process of preparing compressible and elastic material which consists in mixing measured quantities of melted bituminous material, rubber, a vulcanizing agent and fibrous material in a mechanical mixer equipped with heating means to retain the mixture at a predetermined melted consistency, prolonging the mixing operation after all the materials have been introduced into the mixture to thoroughly mix the same, and finally removing the mixture from the mechanical mixer while in a warm, flowable, plastic condition and immediately reducing the same into preformed strips by extrusion.

8. The herein described method of making compressible and elastic material which comprises mixing approximately sixty-five (65) per cent of melted bituminous material, fifteen (15) per cent of a rubber material together with five (5) per cent of a vulcanizing agent, and adding thereto fifteen (15) per cent fibrous material, mixing said ingredients thoroughly to form a homogeneous mass, while maintaining the bituminous material at a predetermined melted consistency, and finally extruding the mixture while in a warm, flowable, plastic condition to form strips.

Signed at Chicago, Illinois, this 16th day of December, 1925.

ALBERT C. FISCHER.